(12) United States Patent
Valdez et al.

(10) Patent No.: US 8,239,873 B2
(45) Date of Patent: Aug. 7, 2012

(54) SPEEDY EVENT PROCESSING

(75) Inventors: John Valdez, Flower Mound, TX (US);
Ai-Sheng Mao, Irving, TX (US)

(73) Assignee: Verizon Patent and Licensing Inc.,
Basking Ridge, NJ (US)

( * ) Notice: Subject to any disclaimer, the term of this patent is extended or adjusted under 35 U.S.C. 154(b) by 1030 days.

(21) Appl. No.: 12/190,403

(22) Filed: Aug. 12, 2008

(65) Prior Publication Data
US 2010/0043003 A1    Feb. 18, 2010

(51) Int. Cl.
*G06F 9/46* (2006.01)
*G06F 9/00* (2006.01)

(52) U.S. Cl. ........................................ 718/103; 712/244

(58) Field of Classification Search ........................ None
See application file for complete search history.

(56) References Cited

U.S. PATENT DOCUMENTS

| | | | |
|---|---|---|---|
| 7,950,013 B2 * | 5/2011 | Sato et al. ...................... | 718/102 |
| 2005/0033881 A1 * | 2/2005 | Yao ................................. | 710/52 |
| 2005/0147036 A1 * | 7/2005 | Hammarlund et al. ........ | 370/230 |
| 2008/0282072 A1 * | 11/2008 | Leonard et al. ................ | 712/241 |

\* cited by examiner

*Primary Examiner* — Jacob A Petranek

(57) ABSTRACT

A method for event positioning includes categorizing events into event groups based on a priority level, buffering the events in each event group into a group event queue, and determining an optimized position for events within each queue based, at least in part, on a processing time and an expected response time for each event in the group event queue.

17 Claims, 4 Drawing Sheets

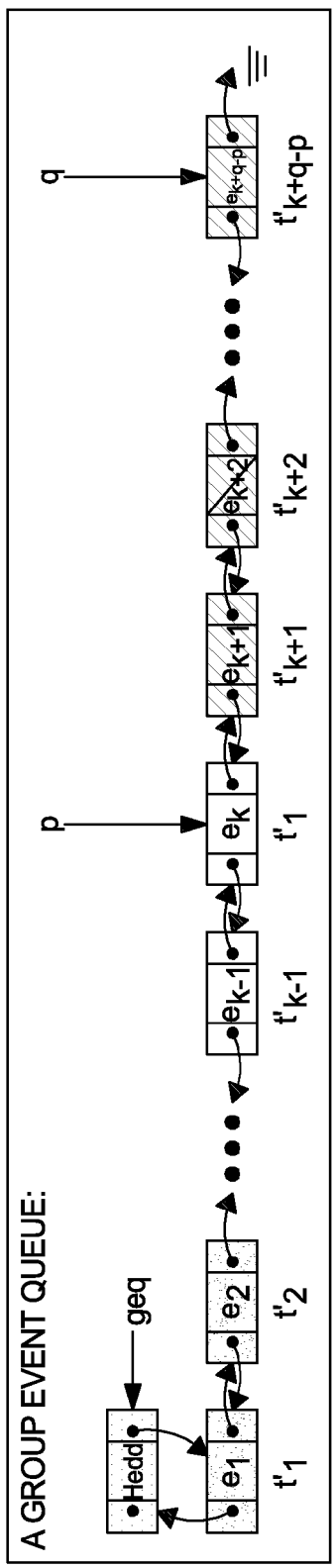

FIG 5a

| EVENT | e1 | e2 | e3 |
|---|---|---|---|
| t' | 4 | 11 | 6 |
| $\varepsilon$ | 5 | 27 | 12 |
| aot | 1 | 12 | -9 |
| t' acc | 4 | 15 | 21 |
| b | 1 | 1 | 0 |

FIG 5b

| EVENT | e1 | e3 | e2 | e4 |
|---|---|---|---|---|
| t' | 4 | 6 | 11 | 5 |
| $\varepsilon$ | 5 | 12 | 27 | 6 |
| aot | 1 | 2 | 6 | -20 |
| t' acc | 4 | 10 | 21 | 26 |
| b | 1 | 1 | 1 | 0 |

FIG 5c

| EVENT | e1 | e3 | e4 | e2 |
|---|---|---|---|---|
| t' | 4 | 6 | 5 | 11 |
| $\varepsilon$ | 5 | 12 | 6 | 27 |
| aot | 1 | 2 | -9 | 1 |
| t' acc | 4 | 10 | 15 | 26 |
| b | 1 | 1 | 0 | 1 |

FIG 5d

| EVENT | e1 | e3 | e4 | e2 |
|---|---|---|---|---|
| t' | — | 6 | 5 | 11 |
| $\varepsilon$ | — | 8 | 2 | 23 |
| aot | — | 2 | -9 | 1 |
| t' acc | — | 6 | 11 | 22 |
| b | — | 1 | 0 | 1 |

SPEEDY EVENT PROCESSING

BACKGROUND

In computer processing, an event is a piece of application-level information from an underlying framework that can occur indeterministically from random stimuli of users or devices and can vary depending on the type of processor or hardware being employed. A particular system hardware design may include a variety of devices, including integrated components that may appear statically or dynamically. A static device generally exists in built-in hardware, while a dynamic device is added and removed through end-user interception. Dynamic devices may include, for example, power management, multimedia applications, speakers, touch screens, flash memory, or Bluetooth™ devices. Both static and dynamic devices serve as sources for asynchronously generating user events that need to be handled by embedded software (e.g., event handlers).

One approach is to use a temporary buffer, such as an event queue, to latch occurred events in order (i.e., First-In-First-Service (FIFS) according to their arrival time) to asynchronously process them later. In a simplest form, without the support of the operating system, a single running program needs to use looping and buffering for event processing. Buffered event data are obtained from either an interrupt service routine or active device polling. The code arrangement within the looping program implies an order of execution. In this case, an event service time is up to the worst case of the loop time.

Another approach includes implementing a multi-threading process, which is a programming and execution model that allows multiple threads of execution to exist within the context of a single process, sharing process resources, but able to execute independently. Threads provide a way for a program to split itself into two or more simultaneously running tasks. In general, multi-threading processes are implemented on an operating system level or within an application. Because threads are often spawned from a main thread (e.g., retrieving data, then displaying the data requires two threads), event handlers that are within an application level often get saturated, and as a result, will undesirably flush an existing event queue.

Accordingly, there exists a need for a system and method capable of prioritizing and repositioning events within a queue such that an event's execution waiting time to meet its response time is decreased without scarifying the expectation of completing other events.

BRIEF DESCRIPTION OF THE DRAWINGS

FIG. 3 illustrates an exemplary group event queue;

FIGS. 5a-5d show tables illustrating computational values for exemplary incoming events according to the disclosed event positioning mechanism.

DETAILED DESCRIPTION

A mechanism that positions a newly arriving event into a group event queue to meet the event's expected response time is provided. The mechanism categorizes asynchronous user and device events according to their demanded response levels into a configurable number of event groups. Prioritized events with equal importance in the same event group are buffered into a queue and processed by a thread. For concurrency, multiple threads are created, one for each event group. A created thread has the local content scope following the M:1 thread model. In the M:1 thread model all user threads are mapped to one kernel thread; all user threads run on one virtual processor. The mapping is handled by a library scheduler. All user threads programming facilities are completely handled by the library. The determination of thread priority is derived from the number of event groups and available range of thread priorities.

Figure 1:
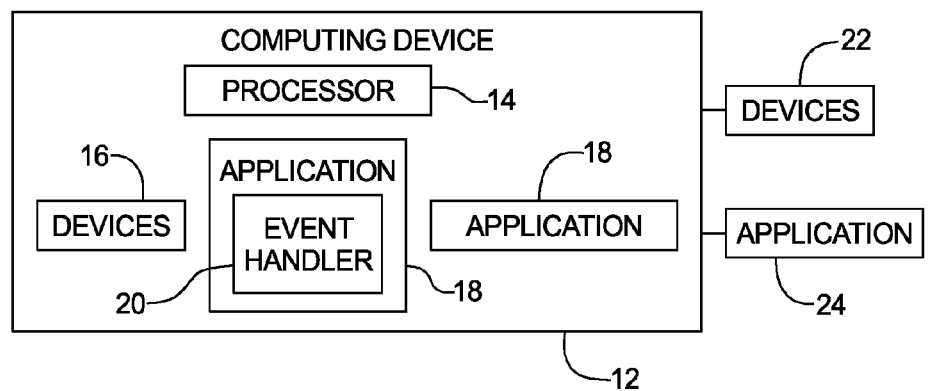
FIG. 1 illustrates an exemplary computing system.

FIG. 1 illustrates an exemplary system 10 for managing event priorities. A computing device 12 includes at least one processor 14 in communication with a plurality of devices 16 and applications 18, which may further include embedded software applications such as event handlers 20. Computing device 12 may be in further communication with external devices 22 and applications 24. All of the internal and external applications and devices may serve as event sources, and in essence, are all contending for processing priority.

As shown in FIG. 1, computing device 12 generally includes applications 18, which may be software applications tangibly embodied as a set of computer-executable instructions on a computer readable medium within computing device 12. Computing device 12 may be any one of a number of computing devices, such as a personal computer, handheld computing device, cellular telephone, etc. Although only one computing device 12 is shown in FIG. 1 for ease of illustration, system 10 may include multiple computing devices 12. In addition, the system may include any number of devices 16, 22 or applications 18, 24 both external and internal.

Computing devices may employ any of a number of computer operating systems, including, but not limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system.

Computing devices generally each include instructions executable by one or more devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable media includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Figure 2:
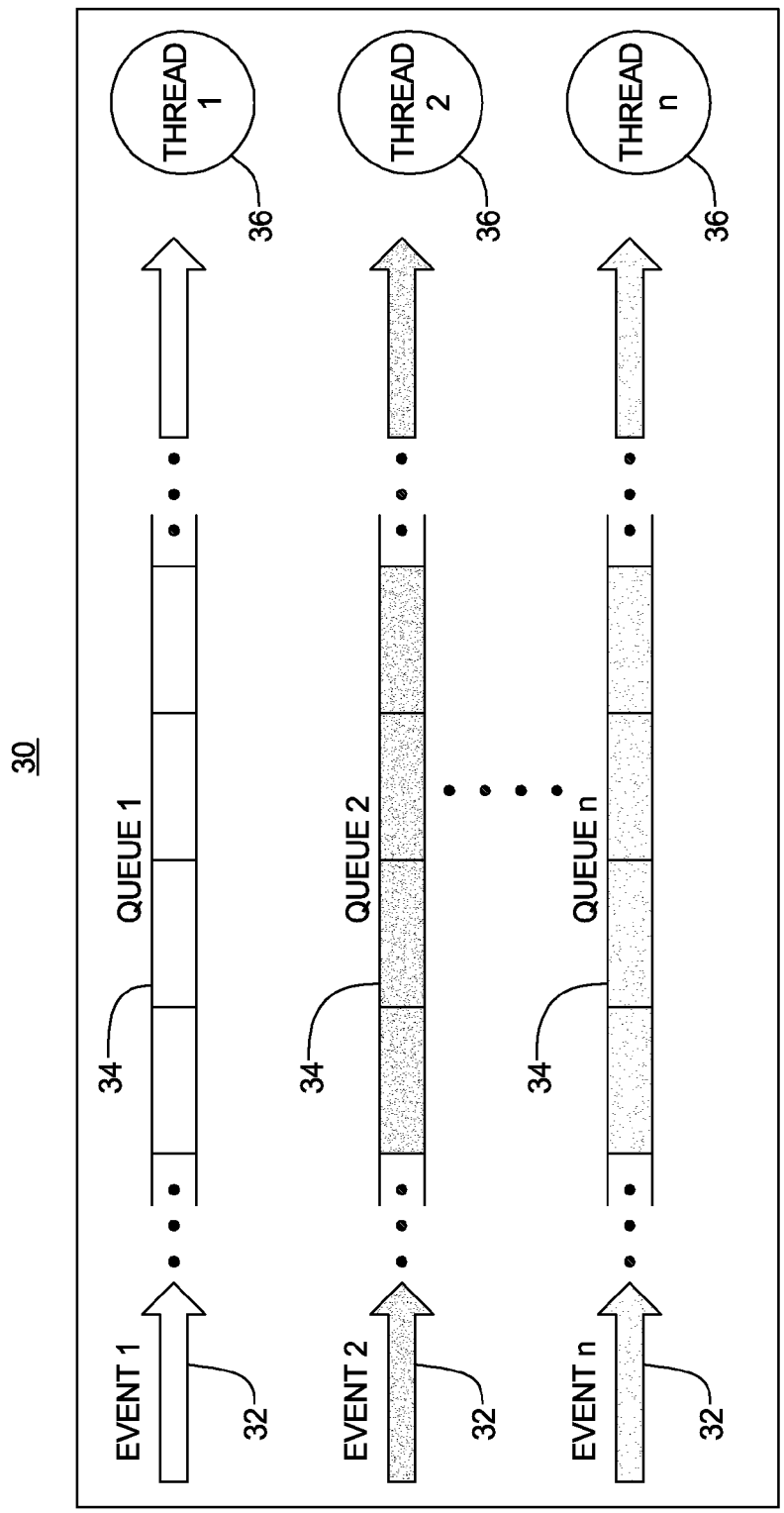
FIG. 2 is a conceptual diagram illustrating an illustrative event processing scheme.

FIG. 2 illustrates a conceptual diagram 30 of an event processing scheme wherein the arrival of events 32 are categorized as a same event group and buffered into an event queue 34 created for that particular event group. For each event group, a thread 36 is created to process the buffered group events in the same event queue 34. A group event may maintain its default First-In-First-Server (FIFS) protocol for queuing and processing, however, application of the event positioning mechanism to an event group as described below provides performance optimization that may change the queuing position of an event for processing.

Mathematical Analyses and Bounds of Mechanism

For illustration, assume that there are M number of event groups, $G=\{G_1, G_2, \ldots, G_M\}$, where $M \geq 1$. Let $n_i$ be the number of events in event group $G_i$. Thus, we have $n_i=|G_i|$ and $n_i \in N=\{n_1, n_2, \ldots, n_M\}$. An event $e_{i,j} \in G_i$, where $1 \leq i \leq M$ and $1 \leq j \leq n_i$, is uniquely defined among the union of event groups G. An arriving event $e_{i,j}$ is temporarily buffered in an event queue created for group $G_i$ and further processed by a created thread associated with the queue. Note that sets G and N are deterministic and well known in the phase of software design.

An event may occur randomly and one differs from another. For analyses, we assume that each event has a property of frequency of occurrence over a period of time, denoted as $f_{i,j}$ for the corresponding event $e_{i,j}$. Furthermore, each event may require a different processing time. Let $t_{i,j}$ be the time that a thread needs to finish the processing of event $e_{i,j}$.

In one exemplary approach, threads created to process buffered events run according to a Round-Robin (RR) scheduling routine. Quota $q_i \in Q=\{q_i|1 \leq i \leq M\}$ is the time slice granted to the running thread processing queued events in group $G_i$. The length of the event queue of group is denoted as $l_i$. The total time to process the first k number of buffered events in the queue created for group $G_i$ is referred to as an accumulative event processing time (AEPT), $T_i \in T=\{T_1, T_2, \ldots, T_M\}$ where $T_i=0$, if k=0; otherwise, $T_i=\Sigma t'_j$, for j=1 to k. Positive integer j indicates the position of an event in the event queue. If an event $e_{i,j} \in G_i$ is at the position p in the queue, then $t'_p=t_{i,j}$, where $t_{i,j}$ is the event processing time as defined earlier. The following gives an example for the definition of an accumulative event processing time (AEPT).

Assume that an event group 2 has ten events, which may be referred to as $G_2=\{e_{2,1}, e_{2,2}, \ldots, e_{2,10}\}$. Seven of them, $e_{2,3}$, $e_{2,5}$, $e_{2,9}$, $e_{2,1}$, $e_{2,8}$, $e_{2,5}$, and $e_{2,2}$, are buffered at the corresponding $1^{st}$, $2^{nd}$, ..., $7^{th}$ positions in its event queue. Note that $e_{2,5}$ appears two times in the queue. For k=6, AEPT $T_2=\Sigma t'_j=t_{2,3}+t_{2,5}+t_{2,9}+t_{2,1}+t_{2,8}+t_{2,5}$, for j=1 to 6. Depending on the event occurrence frequency, a same event may appear more than once in the queue. Moreover, it is possible that at a time instance or a very short time period more than one event occurs. However, a same event will not generate twice at a time instance. Consequently, the number representing the capacity of the queue length should be at least the same as the number of events of an event group. Therefore, $l_i \geq n_i$, where $1 \leq i \leq M$.

Let T' be the waiting time of the idle thread processing queuing events in group $G_i$. T' can be estimated by the total time that other M−1 threads process their queued events. Therefore, in the following equation (E.1), $T_a$ can be replaced by $T_i=0$, if k=0; otherwise, $T_i=\Sigma t'_j$, for j=1 to k.

$$T'=\Sigma T_a=\Sigma\Sigma t'_j, \text{ for } a \neq i, T_a \in T, \text{ and } 1 \leq j \leq l_a. \quad (E.1)$$

In one embodiment, the size of an event queue is large enough to buffer the events occurring in the thread's waiting time. In addition, the event queue will grow because events are added during the thread's execution time. The length of queue in terms of the number of occurred events is a function of event occurrence frequency and thread's scheduling time. Equation (E.2) provides another bound for the length of event queue. Note that $f_{i,j}$ is the frequency occurrence of event $e_{i,j} \in G_i$ as described above.

$$\Sigma f_{i,j}(T'+q_i) \leq l_i, \text{ for } 1 \leq j \leq n_i. \quad (E.2)$$

A comparison of equations (E.1) and (E.2) shows that the lower bound $n_i$ in equation (E.2) represents the maximum number of grouped events that may appear in a time instance, while equation (E.2) reflects the overall requirements of the length of the event queue during a typical thread's life cycle. Intuitively, the value of $\Sigma f_{i,j}(T'+q_i) \gg n_i$. The phenomenon of the arrival of $n_i$ number of events has been considered in equation (E.2) and factored by variables $f_{i,j}$. Consequently, it can be shown that at a particular time instance the length of the event queue will be suddenly increased and saturated by the occurred events.

In one configuration, it is on demand that a running thread has the capability to execute all queued events within a reasonable time. This results in the memory utilization of an event queue bounded by a quasi-constant in a steady state. It is assumed that a thread is running fast enough to process all buffered events, which leads to a tight upper bound for the length of event queue.

$$\Sigma t'_j \leq q_i, \text{ for } j=1 \text{ to } l_i. \quad (E.3)$$

Let $t_a$ be the value such that $\Sigma t'_j=l_i t_a$. Note that time $t_a$ depends on queued events and varies along the time. By substituting equation (E.3), the bindings of the length of the event queue for group $G_i$ can be expressed as:

$$l_i \leq q_i/t_a. \quad (E.4)$$

Define an event $\hat{e} \in G_i$ that has the maximum event occurrence frequency $f^{max}$, that is $f^{max}=\max(f_{i,j})$, where $1 \leq i \leq M$ and $1 \leq j \leq n_i$. Use the notation $\hat{t}$ as the event processing time of event $\hat{e}$. Assume that $f^{max} \gg f_{i,j}$, which means the value $f^{max}$ is much large than (in some order) those of other events in the group. Based on this assumption, the events buffered in the event queue are most likely all the event $\hat{e}$. Therefore, $t_a=\hat{t}$. By applying $f^{max}$ to equation (E.2) and carefully combining equations (E.2) and (E.4) together, we conclude our derivation as follows.

$$n_i f^{max}(T'+q_i) \leq l_i \leq q_i/\hat{t}, \text{ where } 1 \leq i \leq M. \quad (E.5)$$

In equation (E.5), $(T'+q_i)=\Sigma q_m$, where $1 \leq m \leq M$. Note that equation (E.5) is true if and only if the following condition is satisfied.

$$\hat{t} \leq q_i/(n_i f^{max} \Sigma q_m), \text{ where } 1 \leq i, m \leq M. \quad (E.6)$$

The Event Positioning Mechanism

An event positioning mechanism includes a set of heuristics that position a newly arriving event into its group event queue to meet the event expected response time. An exemplary group event queue is shown in FIG. 3. The heuristics associated with the event positioning mechanism are applied to an occurred event in an attempt to move the event forward toward the head of the queue to achieve a local optimum, without affecting other event's expectation. For purposes of this illustration, assume that there are k number of buffered events $e_i$, where $1 \leq i \leq k$, in a group event queue as shown in FIG. 3. Each event $e_i$ has an event processing time $t'_i$, as set forth above and an expected response time, $\epsilon_i$. The positive integer i indicates the position of event $e_i$ in the group event queue. Note that the expected response time of an event appears to be greater than or equal to the event processing time, that is, $\epsilon_i \geq t'_i$.

The ahead-of-time (AOT) value of a queued event is defined as the differential time between its expected response time and finishing time. An event's AOT indicates the time delay tolerance of the event. The value of the AOT reflects the degree of allowance to be delayed without missing an event's expected response time. This permissible limitation conditionally provides other events an opportunity to execute earlier. The accumulative event processing time (AEPT) of event $e_i$, denoted as $t'_{acc}(e_i)$, is the sum of event processing time of events that are buffered at the front of event $e_i$ in the event queue. Thus, $t'_{acc}(e_i) = \Sigma t'_j$, for j=1 to i−1. The AOT time of event $e_i$ can be estimated by equation (E.7). In an alternative implementation, a static variable such as $t'_{total\_acc}$ may be defined to avoid redundant calculations of value $t'_{acc}(e_i)$.

$$\text{aot}(e_i) = \epsilon_i - (t'_{acc}(e_i) + t'_i), \text{ where } 1 \leq i \leq k. \tag{E.7}$$

The $\text{aot}(e_i)$ value may then be used to define a bit $b(e_i)$ that serves as an indicator of event's time delay tolerance, as shown in equation (E.8).

$$b(e_i) = 1, \text{ if aot}(e_i) > 0; \text{ otherwise, } b(e_i) = 0. \tag{E.8}$$

The indicator bit $b(e_i)$ may be developed as a bit-vector for quickly checking if an event has the capability to tolerate a time delay. Implicitly, a queued event without time-delay tolerance indicates a boundary position in the queue that restricts other events at a latter position from being re-positioned ahead of it.

Event Nodes and Sub-lists

As shown in FIG. 3, there are two types of list nodes distinguished by shaded lines. Those nodes without shaded lines, namely the event positioned (EP) event nodes, are the list nodes that contain events that have had their position in the event queue determined by applying the EP heuristics to them. The nodes with shaded lines, the non-EP event nodes, are the event-list nodes appended by an event raiser and waiting for the resolution of their new positions. Logically, these two kinds of list nodes partition a group event queue into two sub-lists: the EP sub-list and the non-EP sub-list.

There are three defined pointers shown in FIG. 3; geq, p, and q. Pointer gep designates a header node of the event queue, pointer p the tail of EP sub-list, and pointer q the tail of non-EP sub-list. When the EP sub-list is empty, the boundary value of pointer p=geq, which points to the header of the group event queue. The condition in which pointer q is a null pointer, or its value is 0, indicates an empty non-EP sub-list. When the non-EP sub-list is empty, the newly added event-list node is appended to the group event queue with the help of the next (right) of pointer p; otherwise, use the point q instead.

An event handler starts to process the first event obtained from the event node at the head of the EP sub-list, while an event raiser appends a new event-list node to the tail of the non-EP sub-list pointed by q. When running the EP heuristic, a servicing routine positions the event-nodes from the non-EP sub-list into the EP sub-list—applying to one event-node each time and starting at the head of non-EP sub-list.

Criteria for Exchanging Positions

Assume for purposes of this example that event node $e_{k+1}$ is the first non-EP event that the EP heuristic applies to, as shown in FIG. 3. Assume that event $e_{k+1}$ has the event processing time $t'_{k+1}$ and the expected response time $\epsilon_{k+1}$. The AOT of event $e_{k+1}$, $\text{aot}(e_{k+1})$, and indicator $b(e_{k+1})$ are given by equation (E.7) and (E.8) in which the event's accumulative event processing time, AEPT, is given by $t'_{total\_acc} \leftarrow t'_{total\_acc} + t'_{k+1}$ and $t'_{acc}(e_{k+1}) \leftarrow t'_{total\_acc}$. The EP heuristic first accesses the EP event node $e_k$ that is the closest neighbor of event node $e_{k+1}$. If the value of $b(e_k) > 0$, it means that event $e_k$ has the capability to tolerate a time delay. For this case, the EP heuristic further examines the possibility that event nodes $e_k$ and $e_{k+1}$ are exchangeable. In one implementation, the decision to exchange their positions is based on whether, 1) an event with a smaller tolerance of time delay may need to be placed at a front position, and 2) if exchanging positions, an event with the new delay still meets its expected response time.

For the first criterion, the new AOT of event $e_{k+1}$ is calculated as if event $e_{k+1}$ were at the position of event $e_k$. The new AOT is compared with that of event $e_k$. The comparison can be tested by the if-statement in equation (E.9a).

$$\text{if } ((\text{aot}(e_k) - (\text{aot}(e_{k+1}) + t'_k)) > 0) \text{ or if } (\text{aot}(e_k) - \text{aot}(e_{k+1}) - t'_k) \text{ for short.} \tag{E.9a}$$

Assume that event $e_k$ is the event with the larger tolerance. If the degree of tolerance of event $e_k$ is large enough to allow it to be delayed by the amount of event processing time of event $e_{k+1}$ (i.e., $t'_{k+1}$), then these two event nodes can be exchanged.

The second criterion is given by the if-statement in equation (E.9b).

$$\text{if } ((\text{aot}(e_k) - t'_{k+1}) \geq 0). \tag{E.9b}$$

Equations (E.9a) and (E.9b) can be generalized as follows.

$$\text{if } (\text{aot}(e_{k-i}) - \Sigma t'_{k-j} - \text{aot}(e_{k+1}) > 0) \tag{E.9c}$$

and $$\text{if } (\text{aot}(e_{k-i}) - t'_{k-i+1} \geq 0), \text{ where } 1 \leq i \leq k-2 \text{ and } j = 1 \text{ to } i+1. \tag{E.9d}$$

For the two events to exchange their positions, their AOTs and the value of indicator $b(e_{k+1})$ need to be recalculated and updated. The EP heuristic will apply repeatedly to event nodes $e_{k+1}$ and the remaining event nodes in the EP sub-list. When the value of indicator $b(e_i)$ is non-positive or the if-statement is not true, event node $e_{k+1}$ has reached its final position in the EP sub-list.

An Example of the EP Heuristic

Figure 4:
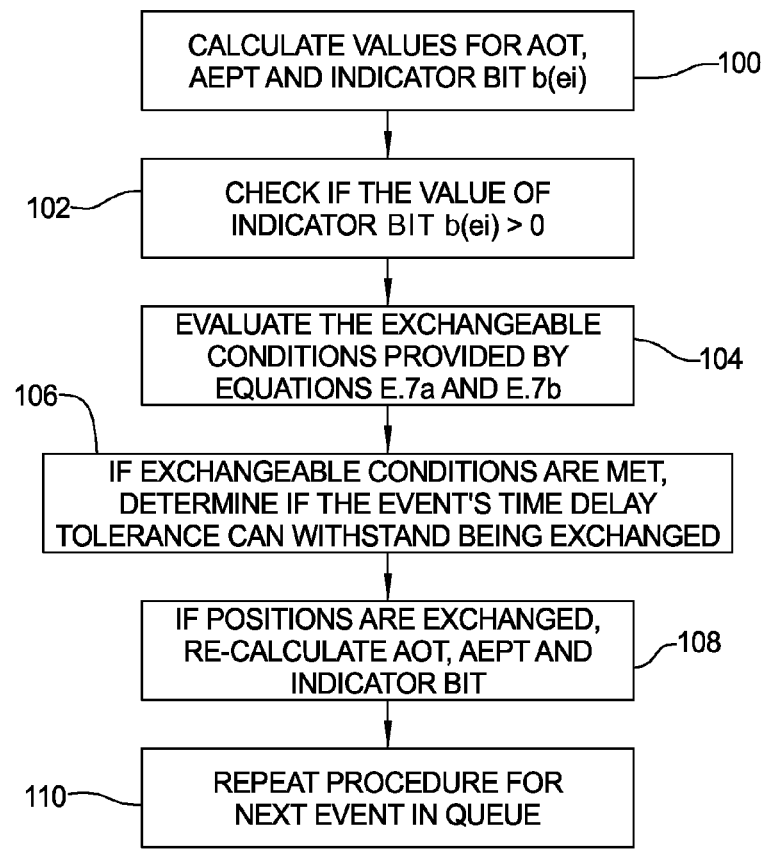
FIG. 4 illustrates an exemplary process for executing an event positioning mechanism.

FIG. 4 illustrates an exemplary method for executing the event positioning (EP) mechanism employing the heuristics set forth above. Referring to FIGS. 5(a)-(d), assume that at a particular time there are four event nodes that have occurred and have been added to a non-EP sub-list—$e_1$, $e_2$, $e_3$, and $e_4$ with their (t', $\epsilon$) pairs of event execution time and expected response time in ms, (4, 5), (11, 27), (6, 12), and (5, 6) respectively. These events are pipelined into an empty EP sub-list for execution by using the EP heuristic.

At step 100, the EP mechanism first calculates by equations (7) and (8) the values of AOT, AEPT, and indicator $b(e_i)$ for events $e_1$, $e_2$, and $e_3$, as shown in FIG. 5(a). Since the $\text{aot}(e_2) > \text{aot}(e_1)$, they are added into the EP sub-list according to their arrival order without their positions being exchanged. However, after checking the value of $b(e_2) > 0$ at step 102, the EP heuristic further analyzes the exchangeable conditions provided by equation (E.9a) and (E.9b) at step 104 for events $e_2$, and $e_3$. It is found that event $e_2$ has a large time delay tolerance and can be delayed to allow event $e_3$ to be executed first. Therefore, their event node positions are exchanged at step 106 and their update values of AOT, AEPT, and indicator $b(e_i)$ are recalculated at step 108 as shown in FIG. 5(b).

At step 110, the same procedure is repeatedly applied to event $e_4$ and moves event node $e_4$ in between event nodes $e_3$, and $e_2$ as shown in FIG. 5(c). Without missing the expected response time of event $e_3$, event nodes $e_3$ and $e_4$ are presented in the first-in-first-serve order the same as they appear. FIG. 5(d) shows the information update of EP event nodes after event-node $e_1$ finishes its processing and is removed from the EP sub-list. The values of AEPT and expected response time are changed for the EP event nodes in order to position the next non-EP event.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
    categorizing an arriving event into one of a plurality of group event queues based on a priority level of the arriving event, each of the plurality of group event queues partitioned to define a non-event-positioned list and an event-positioned list, the non-event positioned list including a plurality of event nodes appended to a tail of the non-event positioned list by an event raiser, the event-positioned list including a plurality of event nodes positioned in the group event queue according to application of a set of event positioning heuristics;
    buffering the arriving event at the tail of the non-event-positioned list of the one of the plurality of group event queues; and
    determining an optimized position for the event at a head node in the non-event-positioned list of the one of the plurality of group event queues, the determining including
        analyzing, based at least in part on a processing time of the event at the head node in the non-event-positioned list and an expected response time of an event in the event-positioned list preceding the event at the head node in the non-event-positioned list, whether the event in the event-positioned list preceding the event at the head node in the non-event-positioned list can be delayed to allow the event at the head node in the non-event-positioned list to be executed first, and
        selectively exchanging the event node positions of the event at the head node in the non-event-positioned list and the event preceding the event in the event-positioned list based on the determination.

2. The method of claim 1, further comprising applying a set of heuristics to events in each of the plurality of group event queues.

3. The method of claim 1, further comprising determining whether the position of two events in the one of the plurality of group event queues meet criteria for exchanging positions.

4. A method, comprising:
    partitioning a group event queue to define a non-event-positioned list and an event-positioned list, the non-event positioned list including a plurality of event nodes appended to a tail of the non-event positioned list by an event raiser, the event-positioned list including a plurality of event nodes positioned in the group event queue according to application of a set of event positioning heuristics;
    calculating a time delay tolerance for an event at a head node in the non-event-positioned list;
    determining an indicator bit based on the value of the time delay tolerance for the event at the head node in the non-event positioned list;
    storing the indicator bit in a bit-vector associated with the group event queue, the indicator bit identifying whether the event is capable of tolerating a time delay; and
    determining according to the indicator bit in the bit-vector whether the event at the head node in the non-event-positioned list is exchangeable with an adjacent event node in the event-positioned list.

5. The method of claim 4, further comprising determining the time delay tolerance according to an expected response time of the event and a finishing time of the event.

6. The method of claim 4, further comprising:
    calculating an accumulative event processing time of the event; and
    calculating the time delay tolerance according to the accumulative event processing time.

7. The method of claim 6, wherein the accumulative event processing time is the sum of the event processing times for each event in the event queue that proceeds the arriving event.

8. The method of claim 4, wherein the indicator bit represents an ability of the event to tolerate a time delay without missing an expected response time of the event.

9. A method, comprising:
    partitioning a group event queue to define a non-event-positioned list and an event-positioned list, the non-event positioned list including a plurality of event nodes appended to a tail of the non-event positioned list by an event raiser, the event-positioned list including a plurality of event nodes positioned in the group event queue according to application of a set of event positioning heuristics;

applying the set of event positioning heuristics to an event at a head node of the non-event-positioned list; and determining an optimized position within the event-positioned list for the event at the head node of the non-event-positioned list.

10. The method of claim 9, wherein applying a set of event positioning heuristics includes:

calculating a time delay tolerance for the event at the head node of the non-event-positioned list; and determining an indicator bit based on the value of the time delay tolerance for the event at the head node.

11. The method of claim 10, further comprising determining whether the event at the head node of the non-event-positioned list is exchangeable with an adjacent event node if the indicator bit identifies the adjacent event node as capable of tolerating a time delay.

12. The method of claim 11, wherein determining whether the event at the head node of the non-event-positioned list is exchangeable with an adjacent event node is based upon meeting predetermined criteria.

13. A method, comprising:

partitioning a group event queue to define a non-event-positioned list and an event-positioned list, the non-event positioned list including a plurality of event nodes appended to a tail of the non-event positioned list by an event raiser, the event-positioned list including a plurality of event nodes positioned in the group event queue according to application of a set of event positioning heuristics;

calculating a time delay tolerance for an event at a head node in the non-event-positioned list;

determining an indicator bit based on the value of the time delay tolerance for the event at the head node; and determining whether the event at the head node is exchangeable with an adjacent event node in the event-positioned list if the indicator bit identifies the adjacent event node as capable of tolerating a time delay.

14. The method of claim 13, wherein determining whether the event at the head node of the non-event-positioned list is exchangeable with an adjacent event node is based upon meeting predetermined criteria.

15. A system, comprising:

a computing device that includes an application configured to:

partition a group event queue to define a non-event-positioned list and an event-positioned list, the non-event positioned list including a plurality of event nodes appended to a tail of the non-event positioned list by an event raiser, the event-positioned list including a plurality of event nodes positioned in the group event queue according to application of a set of event positioning heuristics;

calculate a time delay tolerance for an event at a head node in the non-event-positioned list;

determine an indicator bit based on the value of the time delay tolerance for the event at the head node; and determine whether the event at the head node is exchangeable with an adjacent event node in the event-positioned list if the indicator bit identifies the adjacent event node as capable of tolerating a time delay.

16. A system, comprising:

a non-transitory computer readable medium that includes an application configured to:

calculate a time delay tolerance for an event at a head node in a non-event-positioned list in an event queue, the non-event positioned list including a plurality of event nodes appended to a tail of the non-event positioned list by an event raiser;

determine an indicator bit based on the value of the time delay tolerance for the event at the head node; and determine whether the event at the head node is exchangeable with an adjacent event node in an event-positioned list in the event queue if the indicator bit identifies the adjacent event node as capable of tolerating a time delay, the event-positioned list including a plurality of event nodes positioned in the group event queue according to application of a set of event positioning heuristics.

17. A non-transitory computer-readable medium tangibly embodying computer-executable instructions for:

calculating a time delay tolerance for an event at a head node in a non-event-positioned list, the non-event positioned list including a plurality of event nodes appended to a tail of the non-event positioned list by an event raiser;

determining an indicator bit based on the value of the time delay tolerance for the event at the head node; and determining whether the event at the head node is exchangeable with an adjacent event node in the event-positioned list in the event queue if the indicator bit identifies the adjacent event node as capable of tolerating a time delay, the event-positioned list including a plurality of event nodes positioned in the group event queue according to application of a set of event positioning heuristics.

* * * * *